United States Patent
Chen (10) Patent No.: US 10,139,075 B2
(45) Date of Patent: Nov. 27, 2018

(54) REFLECTIVE LIGHT GUIDE TUBE AND LED LIGHT SOURCE, AND OPTICAL SYSTEM

(71) Applicant: GUANGZHOU YAJIANG PHOTOELECTRIC EQUIPMENT CO., LTD, Guangdong (CN)

(72) Inventor: Zhiman Chen, Guangdong (CN)

(73) Assignee: GUANGZHOU YAJIANG PHOTOELECTRIC EQUIPMENT CO., LTD, Guangdong (CN)

( * ) Notice: Subject to any disclaimer, the term of this patent is extended or adjusted under 35 U.S.C. 154(b) by 0 days.

(21) Appl. No.: 15/515,151

(22) PCT Filed: Dec. 31, 2015

(86) PCT No.: PCT/CN2015/100235
§ 371 (c)(1),
(2) Date: Mar. 29, 2017

(87) PCT Pub. No.: WO2016/188117
PCT Pub. Date: Dec. 1, 2016

(65) Prior Publication Data
US 2017/0211777 A1 Jul. 27, 2017

(30) Foreign Application Priority Data

May 25, 2015 (CN) .................... 2015 2 0339623 U
May 25, 2015 (CN) .................... 2015 2 0340416 U
(Continued)

(51) Int. Cl.
*F21S 43/237* (2018.01)
*G02B 6/00* (2006.01)
(Continued)

(52) U.S. Cl.
CPC ............. *F21S 43/237* (2018.01); *F21S 43/14* (2018.01); *F21S 43/243* (2018.01); *G02B 6/00* (2013.01);
(Continued)

(58) Field of Classification Search
CPC ........ F21S 43/237; F21S 43/14; F21S 43/243; F21S 43/242; F21S 43/19; F21S 43/235;
(Continued)

(56) References Cited

U.S. PATENT DOCUMENTS 6,205,271 B1 * 3/2001 Bowron ................. G02B 19/00
349/61
7,195,386 B2 * 3/2007 Imade .................. G02B 6/0001
362/551
(Continued)

FOREIGN PATENT DOCUMENTS

CN 201421024 3/2010
CN 202532387 11/2012
(Continued)

OTHER PUBLICATIONS

Machine translation of CN203250043 dated Apr. 16, 2018.*
"International Search Report (Form PCT/ISA/210)", dated Mar. 24, 2016, with English translation thereof, pp. 1-6.

*Primary Examiner* — Laura Tso
(74) *Attorney, Agent, or Firm* — JCIPRNET (57) ABSTRACT

A reflective light guide includes a cylinder enclosed by more than three reflecting plates which connected with each other in turn. The reflecting plate includes a plate body and a reflecting layer arranged on the plate body, along the exit direction of light. The cylinder includes a light inlet part, a light reflecting part and a light outlet part in turn, wherein the light outlet part larger than the light inlet part such that the cylinder being cone shaped. The LED light source with a reflective light guide tube includes a LED light source and (Continued)

a reflective light guide tube. The optical system includes a reflective light guide tube, a LED light source and an optical assembly.

16 Claims, 11 Drawing Sheets

(30) Foreign Application Priority Data

| May 25, 2015 | (CN) | .................... 2015 2 0340418 U |
| May 25, 2015 | (CN) | .................... 2015 2 0340431 U |
| Jul. 17, 2015 | (CN) | .................... 2015 2 0520240 U |

(51) Int. Cl.

| *F21S 43/14* | (2018.01) |
| *F21S 43/243* | (2018.01) |
| *G02B 19/00* | (2006.01) |
| *F21S 8/00* | (2006.01) |
| *F21S 43/242* | (2018.01) |
| *F21S 43/19* | (2018.01) |
| *F21S 43/235* | (2018.01) |
| *F21S 43/241* | (2018.01) |
| *F21V 14/06* | (2006.01) |
| *F21W 131/406* | (2006.01) |
| *F21Y 105/10* | (2016.01) |
| *F21K 9/61* | (2016.01) |
| *F21Y 115/10* | (2016.01) |
| *F21Y 113/13* | (2016.01) |

(52) U.S. Cl.
CPC ................ *G02B 19/00* (2013.01); *F21K 9/61* (2016.08); *F21S 8/00* (2013.01); *F21S 43/19* (2018.01); *F21S 43/235* (2018.01); *F21S 43/241* (2018.01); *F21S 43/242* (2018.01); *F21V 14/06* (2013.01); *F21W 2131/406* (2013.01); *F21Y 2105/10* (2016.08); *F21Y 2113/13* (2016.08); *F21Y 2115/10* (2016.08)

(58) Field of Classification Search
CPC .... F21S 43/241; F21S 48/2237; F21S 48/215; F21S 48/2262; F21S 48/211; F21S 48/2225; F21S 48/225; F21S 48/2256
USPC ............................ 362/545, 558; 341/61, 65
See application file for complete search history.

(56) References Cited

U.S. PATENT DOCUMENTS

| 8,993,953 | B2 | 3/2015 | Dai et al. |
| 2005/0135113 | A1* | 6/2005 | Wang ...................... H01L 33/60 |
| | | | 362/561 |
| 2014/0191118 | A1 | 7/2014 | Dai et al. |
| 2016/0061400 | A1* | 3/2016 | Woodward .......... F21S 48/1323 |
| | | | 362/518 |

FOREIGN PATENT DOCUMENTS

| CN | 103091074 | 5/2013 |
| CN | 203082684 | 7/2013 |
| CN | 203250043 | 10/2013 |
| CN | 204026342 | 12/2014 |
| CN | 204647929 | 9/2015 |
| CN | 204648006 | 9/2015 |
| CN | 204648116 | 9/2015 |
| CN | 204879674 | 12/2015 |
| JP | 2011090962 | 5/2011 |
| JP | 5379642 | 12/2013 |
| WO | 2014107896 | 7/2014 |

* cited by examiner

REFLECTIVE LIGHT GUIDE TUBE AND LED LIGHT SOURCE, AND OPTICAL SYSTEM

CROSS-REFERENCE TO RELATED APPLICATION

This application is a 371 application of an international PCT application serial no. PCT/CN2015/100235, filed on Dec. 31, 2015, which claims priority to and the benefit of China Patent Application No. CN201520340418.7, filed on May 25, 2015, China Patent Application No. CN201520339623.1, filed on May 25, 2015, China Patent Application No. CN201520340431.2, filed on May 25, 2015, China Patent Application No. CN201520340416.8, filed on May 25, 2015, and China Patent Application No. CN201520520240.4, filed on Jul. 17, 2015, the disclosures of which are incorporated herein by reference in its entirety.

FIELD OF THE INVENTION

The present invention relates to a light guide tube, a LED source and an optical system with a light guide tube, particularly to a light guide tube capable of carrying out multiple reflection and capable of changing the angle of emitting light.

BACKGROUND OF THE INVENTION

For LED lamps, different angles of emitting light and luminous efficacy are usually got through optical elements including lenses, reflective bowl currently, etc.

Lenses are the most common optical elements in LED lamps, and mainly used to focus light.

In LED lamps, if a reflective bowl is used, optical angle control can be implemented by constructing a more complex reflective curved surface, the uniformity of light mixing is also difficult to control. When forming a light spot, it's also vulnerable to defects in optical effects, such as, bright spots at the light spot center, falsely light and stray light around the light spot, etc.

Of course, light guide pillars are also used as light guide elements in certain lamps, and so far, light guide pillars are substantially plastic light guide pillars due to the manufacturing process. The guiding principle of the light guide pillars is using two kinds of mediums of different refractive indices to enable total internal reflection of light entering into a light guide pillar to occur at the boundary of the light guide pillar, thereby implementing light guiding. As such, once the light guide pillar and its external medium changed, for example there is oil pollution or contact matters on the light guide pillar, total internal reflection of light may not be achieved entirely, then part of light may emit from the side-boundary of the light guide pillar, so that there may be a certain losses in light guiding, that is, whether a light guide pillar can carry out light guiding normally significantly depends on external influences which may cause lower light guiding stability. Considering such influences, a light guide pillar should not be fixed arbitrarily, otherwise, the refractive property of the light guide pillar may be influenced. Furthermore, all the plastic optical materials have problems of low transmittance, when the light travels longer in plastic material, there may be a lower transmittance. Plastic materials also have lower heat resistance, usually around 120°. Where near the light source on the plastic light guide pillar, there may be a burning phenomenon due to the high temperature.

Of course, the solution using a light guide tube to guide light is developed now. For example, a light guide tube is used as a light guide element in a LED remote projection lamp disclosed in the Patent Application No. 201220694731.7. However, there's a trouble in manufacturing to implement the function the light reflection and guiding as the light guide tube is cone shaped.

SUMMARY OF THE INVENTION

In order to manufacture light guide tubes better, reduce costs, the present invention provides a reflective light guide tube.

In order to manufacture light guide tubes better, reduce costs, and make more uniform color of emitting light, the present invention provides a LED light source with a reflective light guide tube.

In order to manufacture light guide tubes better, reduce costs, make more uniform color of emitting light and carry out a secondary light focusing, the present invention provides a LED optical system.

In order to manufacture light guide tubes better, reduce costs, make more uniform color of emitting light and carry out a secondary light focusing, in order to adjust focus easily, the present invention provides a variable focus LED optical system.

In order to manufacture light guide tubes better, reduce costs, make more uniform color of emitting light, and capable of focusing light, the present invention provides a stage lamp optical system.

The first goal above to be achieved by providing a reflective light guide tube, comprising a cylinder enclosed by more than three reflecting plates which connected with each other in turn, the reflecting plate comprising a plate body and a reflecting layer arranged on the plate body, along the exit direction of light, the cylinder comprising a light inlet part, a light reflecting part and a light outlet part in turn, wherein the light outlet part larger than the light inlet part such that the cylinder being cone shaped.

As an improvement, the said plate body is a glass plate, the reflecting layer s plated on the inner surface of the glass plate.

As an improvement, the angle at which light enters into the cylinder is a, the angle at which light emits from the cylinder is b, the included angle of the reflecting layer and the center axis of the cylinder is c, the number light being reflected is n, then b=a−2nc.

As an improvement, the reflecting plates are connected with each other by mucilage glue.

The advantageous effects of the light guide tube are as follows: as the cylinder is composed of more than three reflecting plates, the reflecting player is formed on the cylinder first, then the reflecting plates are connected with each other, which makes the forming of the reflecting layer easier, simple and uniform, has excellent temperature resistance as well, so the manufacture of the reflective light guide tube of the present invention is easier, simple and low-cost, the reflecting player is uniform, thus has high reflectivity and good reflection effect. Because light may be reflected more than twice in the cylinder except the center light, light may be physically mixed during reflection, therefore the light color of emitting light through the cylinder may be more uniform with no color difference. In the present invention, by using a cone shaped cylinder, the angle of emitting light may be reduced, so the practical requirement may be met more easily. As mucilage glue is used to connect the reflecting plates, it's easier to connect the reflecting plates.

The second goal above to be achieved by providing a LED light source with a reflective light guide tube, comprising a reflective light guide tube and a LED light source; the reflective light guide tube comprising a cylinder enclosed by more than three reflecting plates which connected with each other in turn, the said reflecting plate comprising a plate body and a reflecting layer arranged on the plate body, along the exit direction of light, the cylinder comprising a light inlet part, a light reflecting part and a light outlet part in turn, wherein the light outlet part larger than the light inlet part such that the cylinder being cone shaped; the LED light source arranged at the end of the light inlet part.

As an improvement, the LED source comprises more than two kinds of LED chips of different colors.

As an improvement, the said plate body is a glass plate, the reflecting layer is plated on the inner surface of the glass plate.

As an improvement, the angle at which light enters into the cylinder is a, the angle at which light emits from the cylinder is b, the included angle of the reflecting layer and the center axis of the cylinder is c, the number light being reflected is n, then b=a−2nc.

As an improvement, the reflecting plates are connected with each other by mucilage glue.

As an improvement, the said LED light source comprises white, red, blue and green light chips.

The advantageous effects of the LED light source with a reflective light guide tube are as follows: as the cylinder is composed of more than three reflecting plates, the reflecting player is formed on the cylinder first, then the reflecting plates are connected with each other, which makes the forming of the reflecting layer easier, simple and uniform, has excellent temperature resistance as well, so the manufacture of the LED light source with a light guide tube of the present invention is easier, simple and low-cost, the reflecting player is uniform, thus has high reflectivity and good reflection effect. Because light may be reflected more than twice in the cylinder except the center light, once multiple kinds of LED chips of different colors are used, light may be physically mixed during reflection after passed through the cylinder, therefore the light color of emitting light through the cylinder may be more uniform with no color difference. In the present invention, by using a cone shaped cylinder, the angle of emitting light may be reduced, so the practical requirement may be met more easily. As mucilage glue is used to connect the reflecting plates, it's easier to connect the reflecting plates.

The third goal above to be achieved by providing a LED optical system, comprising a reflective light guide tube, a LED light source and a lens, the reflective light guide tube comprising a cylinder enclosed by more than three reflecting plates which connected with each other in turn, the said reflecting plate comprising a plate body and a reflecting layer arranged on the plate body, along the exit direction of light, the cylinder comprising a light inlet part, a light reflecting part and a light outlet part in turn, wherein the light outlet part larger than the light inlet part such that the cylinder being cone shaped, the LED light source arranged at the end of the light inlet part, the lens arranged in front of the cylinder in the exit direction of light.

As an improvement, the said plate body is a glass plate, the reflecting layer is plated on the inner surface of the glass plate.

As an improvement, the angle at which light enters into the cylinder is a, the angle at which light e its from the cylinder is b, the included angle of the reflecting layer and the center axis of the cylinder is c, the number light being reflected is n, then b=a−2nc.

As an improvement, the reflecting plates are connected with each other by mucilage glue.

As an improvement, the said LED light source comprises white, red, blue and green light chips.

The advantageous effects of the LED optical system are as follows: as the cylinder is composed of more than three reflecting plates, the reflecting player is formed on the cylinder first, then the reflecting plates are connected with each other, which makes the forming of the reflecting layer easier, simple and uniform, has excellent temperature resistance as well, so the manufacture of the LED light source with a light guide tube of the present invention is easier, simple and low-cost, the reflecting player is uniform, thus has high reflectivity and good reflection effect. Because light may be reflected more than twice in the cylinder except the center light, once multiple kinds of LED chips of different colors are used, light may be physically mixed during reflection after passed through the cylinder, therefore a uniform virtual point light source or area light source may be formed behind the lens in front of the light guide tube. After the light source passed through the lens further, the light color of emitting light will be ore uniform with no color difference. Additionally, the lens can carry out a secondary focusing to the light source, in order to meet the requirement for light emitting. In the present invention, by using a cone shaped cylinder, the angle of emitting light may be reduced, so the practical requirement may be met more easily. As mucilage glue is used to connect the reflecting plates, it's easier to connect the reflecting plates.

The fourth goal above to be achieved by providing a variable focus LED optical system, comprising a reflective light guide tube, a LED light source and an optical assembly movable relative to the reflective light guide tube in the exit direction of light; the reflective light guide tube comprising a cylinder enclosed by more than three reflecting plates which connected with each other in turn, the said reflecting plate comprising a plate body and a reflecting layer arranged on the plate body; along the exit direction of light, the cylinder comprising a light inlet part, a light reflecting part and a light outlet part in turn, wherein the light outlet part larger than the light inlet part such that the cylinder being cone shaped, the LED light source arranged at the end of the light inlet part; the optical assembly arranged in front of the cylinder in the exit direction of light, and driven by a driving device.

As an improvement, the LED light source comprises two kinds of LED chips of different colors.

As an improvement, the said plate body is a glass plate, the reflecting layer is plated on the inner surface of the glass plate.

As an improvement, the angle at which light enters into the cylinder is a, the angle at which light emits from the cylinder is b, the included angle of the reflecting layer and the center axis of the cylinder is c, the number light being reflected is n, then b=a−2nc.

As an improvement, the reflecting plates are connected with each other by mucilage glue.

As an improvement, the said LED light source comprises white, red, blue and green light chips.

As an improvement, the said driving device comprises a base, a screw arranged on the base, a nut fixed in the optical assembly, and a motor, the nut engaged with the screw, and the motor driving the screw to rotate.

The advantageous effects of the variable focus LED optical system are as follows: as the cylinder is composed of more than three reflecting plates, the reflecting player is formed on the cylinder first, then the reflecting plates are connected with each other, which makes the forming of the reflecting layer easier, simple and uniform, has excellent temperature resistance as well, so the manufacture of the LED light source with a light guide tube of the present invention is easier, simple and low-cost, the reflecting player is uniform, thus has high reflectivity and good reflection effect. Because light may be reflected more than twice in the cylinder except the center light, once multiple kinds of LED chips of different colors are used, light may be physically mixed during reflection after passed through the cylinder, therefore a uniform virtual point light source or area light source may be formed at the outlet of the light guide tube or behind the optical assembly in front. After the light source passed through the optical assembly further, the light color of emitting light will be more uniform with no color difference. Additionally, when the light source passes through the optical assembly, if the point light source or area light source is at the focus of the optical assembly, the exit light is parallel light with the smallest angle; if the point light source or area light source is within the focus of the optical assembly, the angle of the exit light varies with the distance between the point light source or area light source and the optical assembly, then change of the size of the light spot emitted may be realized. The specific principle is: the closer the point light source or area light source to the optical assembly, the larger the divergence angle of light; the farther the point light source or area light source to the optical assembly, the smaller the divergence angle of light, when the point light source or area light source is at the focus, the divergence angle of the light is the smallest. As the driving device is arranged, it's easy to adjust the focus. In the present invention, by using a cone shaped cylinder, the angle of emitting light may be reduced, so the practical requirement may be met more easily. As mucilage glue is used to connect the reflecting plates, it's easier to connect the reflecting plates.

The fifth goal above to be achieved by providing a stage lamp optical system, comprising a reflective light guide tube, a LED light source and an optical assembly, the reflective light guide tube comprising a cylinder enclosed by more than three reflecting plates which connected with each other in turn, the said reflecting plate comprising a plate body and a reflecting layer arranged on the plate body; along the exit direction of light, the cylinder comprising a light inlet part, a light reflecting part and a light outlet part in turn, wherein the light outlet part larger than the light inlet part such that the cylinder being cone shaped; the LED light source arranged at the end of the light inlet part, the optical assembly arranged in front of the cylinder in the exit direction of light, comprising a light mixing focusing optical assembly and a light focusing optical assembly, the light mixing focusing optical assembly comprising a light mixing plate and more than one first condensers, the focusing optical assembly arranged behind the light mixing focusing optical assembly, the light focusing assembly comprising more than one second condensers.

As an improvement, the LED light source comprises two kinds of LED chips of different colors.

As an improvement, the said LED light source comprises white, red, blue and green light chips.

As an improvement, the said plate body is a glass plate, the reflecting layer is plated on the inner surface of the glass plate.

As an improvement, the angle at which light enters into the cylinder is a, the angle at which light emits from the cylinder is b, the included angle of the reflecting layer and the center axis of the cylinder is c, the number light being reflected is n, then $b=a-2nc$.

As an improvement, the reflecting plates are connected with each other by mucilage glue.

As an improvement, the light mixing plate is arranged between the cylinder and the first condenser.

As an improvement, the light mixing plate is arranged between the first condenser and the second condenser.

As an improvement, the light mixing plate is a frosted plate or a frosted film or a column distributed micro lenses; the first condenser is a spherical lens, an aspheric lens or a fresnel lens; the second condenser is a spherical lens, an aspheric lens or a fresnel lens.

As an improvement, the light focusing optical assembly is movable relative to the cylinder.

The advantageous effects of the stage lamp optical system are as follows:

(1) As the cylinder is composed of more than three reflecting plates, the reflecting layer is formed on the plate body first and then the reflecting plates are connected with each other, which makes the forming of the reflecting layer easier, simple, and uniform, has a good heat resistance as well, so the manufacture of the reflective light guide tube of the present invention s easier, simple, and low-cost with a uniform reflecting layer, therefore has high reflectivity and good reflecting effect.

(2) Because light may be reflected more than twice in the cylinder except the center light, once multiple kinds of LED chips of different colors are used, light may be physically mixed during reflection after passed through the cylinder, therefor a uniform virtual point light source or area light source may be formed at the outlet of the light guide tube or behind the optical assembly in front. After the light source further passed through the optical assembly, the light color of emitting light will be more uniform due to the arrangement of the light mixing plate, and there's no color difference.

(3) The said first condenser can focus light for the first time, and the second condenser can carry out a secondary focusing.

(4) When the light source passes through the second condenser, if the light source through the light mixing focusing optical assembly is at the focus of the second condenser, the exit light is parallel light with the smallest angle; if the light source through the light mixing focusing optical assembly is within the focus of the second condenser, the angle of the exit light varies with the distance between the light source through the light mixing focusing optical assembly and the second condenser; if the position of the second condenser is changing continuously, change of the size of the light spot emitted may be realized. The specific principle is: the closer the light source through the light mixing focusing optical assembly to the second condenser, the larger the divergence angle of light; the farther the light source through the light mixing focusing optical assembly to the second condenser, the smaller the divergence angle of light, when the light source through the light mixing focusing optical assembly is at the focus, the divergence angle of light is the smallest.

(5) In the present invention, the angle of emitting light may be reduced by using a cone shaped cylinder, so that the practical requirement may be met more easily.

(6) As mucilage glue is used to connect the reflecting plates, it's easier to connect the reflecting plates.

PREFERRED EMBODIMENTS OF THE PRESENT INVENTION

Further illustration on the present invention will be given in the following in conjunction with drawings.

Embodiment 1

Figure 1:
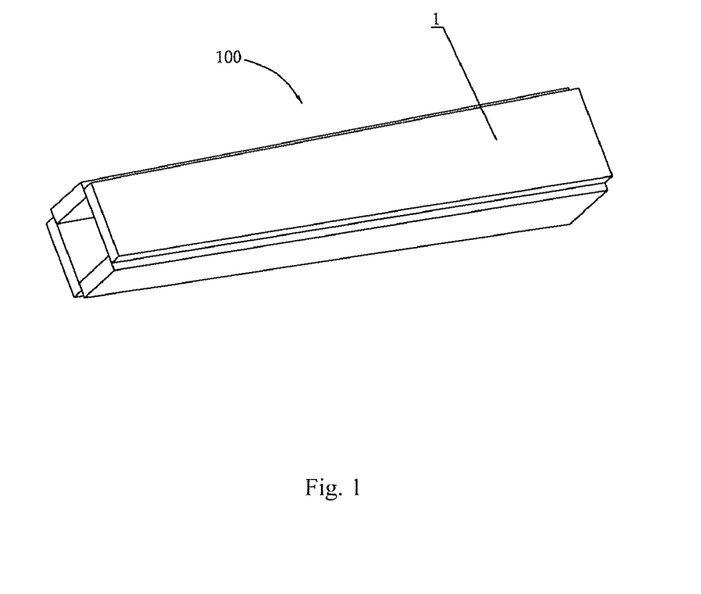
FIG. 1 is a perspective view of a reflective light guide tube.
Figure 2:
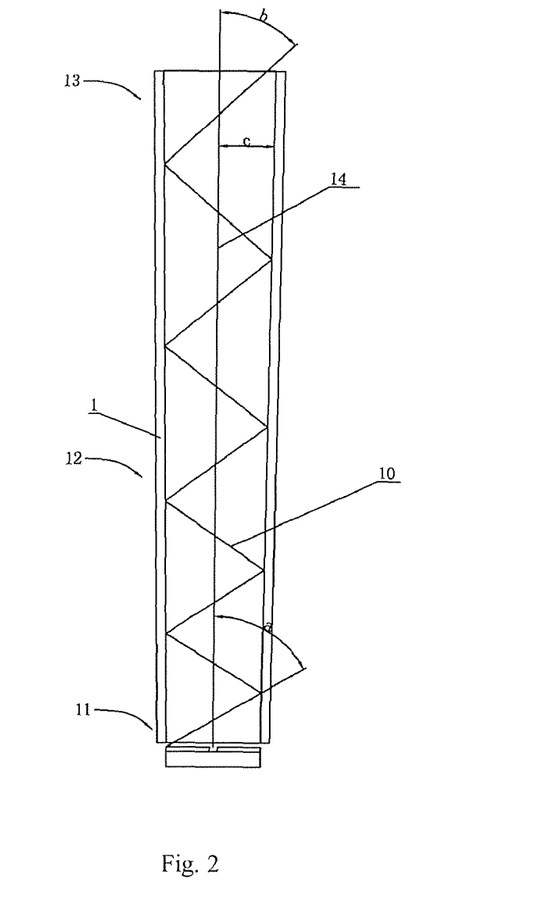
FIG. 2 is a sectional view of a reflective light guide tube.

As shown in FIG. 1 and FIG. 2, a reflective light guide tube includes a cylinder 100 enclosed by more than three reflecting plates 1 which connected with each other in turn. The said reflecting plate 1 includes a plate body and a reflecting layer arranged on the plate body, the reflectivity of the reflecting layer is greater than 98%. Preferably, the said plate body is glass, however other materials can be selected. The reflecting layer is plated on the inner surface of the plate body and is planar. The reflecting plates 1 are connected with each other by mucilage glue, however other connection ways can be used as long as the reflecting plates can be connected securely. Using such structure, the reflecting layer may be formed first, then the reflecting plates may be connected together, this makes the manufacture of the light guide tube easier and low-cost. Furthermore, the reflecting plates formed in such way may have higher uniformity, higher reflectivity, good reflection effect, and higher light utilization efficiency.

Along the exit direction of light, the cylinder includes a light inlet part 11, a light reflecting part 12 and a light outlet part 13 in turn, wherein the light outlet part 13 is larger than the light inlet part 11, so the cylinder is cone shaped, light may be reflected more than twice in the cylinder except the center light. In this implementation, the angle at which light enters into the cylinder is set to a, the angle at which light emits from the cylinder is b, the included angle of the reflecting layer and the center axis 14 of the cylinder is c, the number light being reflected is n, then b=a−2nc. So if the cone shaped cylinder is used, the angle of emitting light may be reduced, the practical requirement may be met more easily. Furthermore, because light may be reflected more than twice in the cylinder except the center light, then light may be physically mixed during reflection, therefore the light color of emitting light will be more uniform with no color difference.

Embodiment 2

Figure 3:
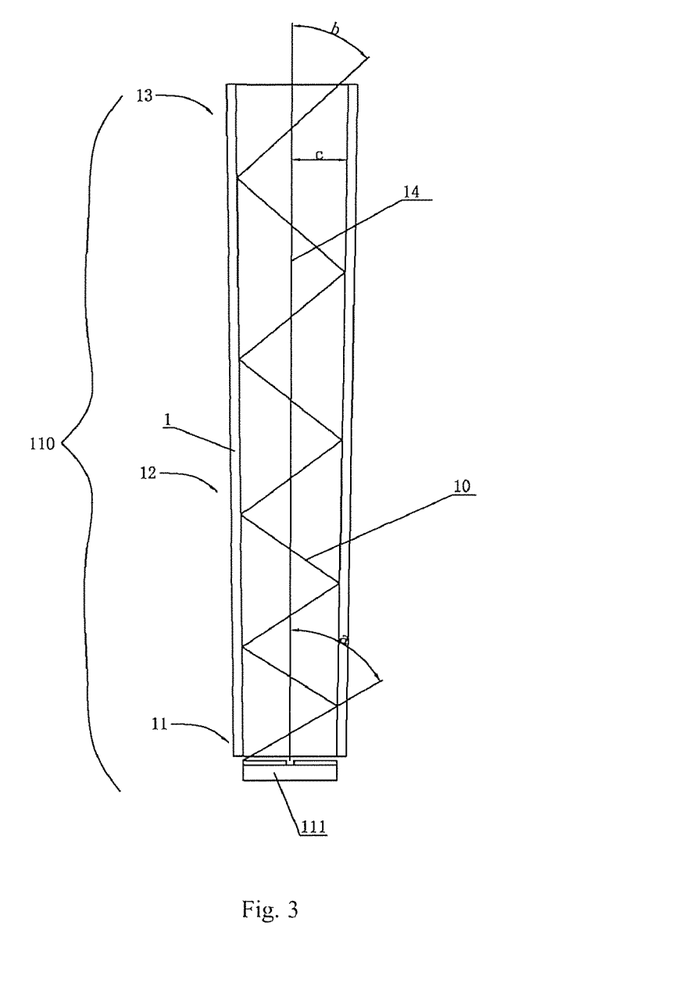
FIG. 3 is a sectional view of a LED light source with a reflective light guide tube.

As shown in FIG. 3, a LED light source with a reflective light guide tube includes a reflective light guide tube 110 and a LED light source 111.

As shown in FIG. 1 and FIG. 3, the reflective light guide tube 110 includes a cylinder 100 enclosed by more than three reflecting plates 1 which connected with each other in turn. The said reflecting plate 1 includes a plate body and a reflecting layer arranged on the plate body, the reflectivity of the reflecting layer is greater than 98%. Preferably, the said plate body is glass, the reflecting layer is plated on the inner surface of the plate body and is planar. The reflecting plates 1 are connected with each other by mucilage glue, however other connection ways can be used as long as the reflecting plates can be connected securely. Using such structure, the reflecting layer may be formed first, then the reflecting plates may be connected together, this makes the manufacture of the light guide tube easier and low-cost. Furthermore, the reflecting plates formed in such way may have higher uniformity, higher reflectivity, good reflection effect, and higher light utilization efficiency.

Along the exit direction of light, the cylinder includes a light inlet part 11, a light reflecting part 12 and a light outlet part 13 in turn, wherein the light outlet part 13 is larger than the light inlet part 11, so the cylinder is cone shaped, light will be reflected more than twice in the cylinder except the center light. In this implementation, the angle at which light enters into the cylinder is set to a, the angle at which light emits from the cylinder is b, the included angle of the reflecting layer and the center axis 14 of the cylinder is c, the number light being reflected is n, then b=a−2nc. So if a cone shaped cylinder is used, the angle of emitting light may be reduced, the practical requirement may be met more easily.

Figure 4:
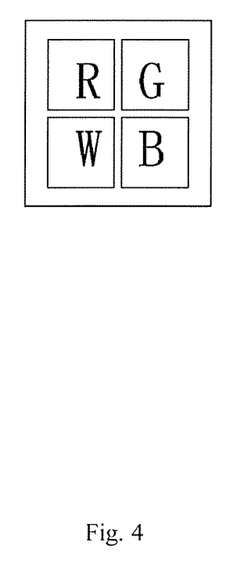
FIG. 4 is a schematic diagram of a LED light source.

As shown in FIG. 4, the LED source 111 is arranged at the end of the inlet part. The said LED light source 111 includes white, red, blue and green light chips.

Because light will be reflected more than twice in the cylinder except the center light, once multiple kinds of chips of different colors are used, light may be physically mixed during reflection, therefore the light color of emitting light will be more uniform with no color difference.

Embodiment 3

Figure 5:
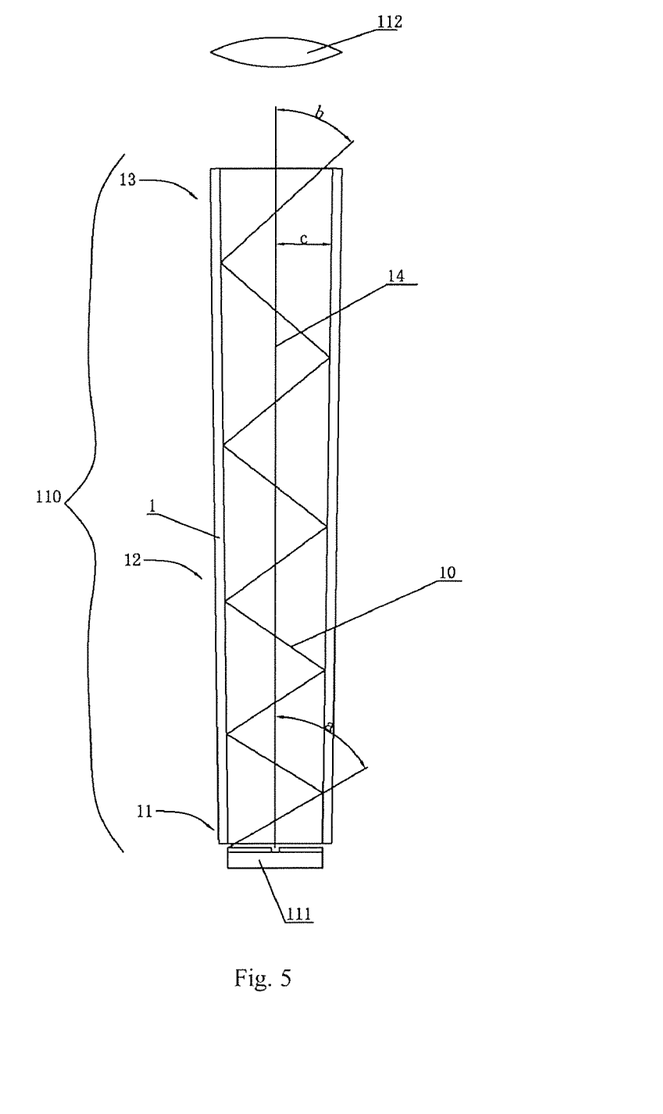
FIG. 5 is a sectional view of a LED optical system.

As shown in FIG. 5, a LED optical system with a reflective light guide tube includes a reflective light guide tube 110, a LED light source 111 and a lens 112.

As shown in FIG. 1 and FIG. 5, the reflective light guide tube 110 includes a cylinder 100 enclosed by more than three reflecting plates 1 which connected with each other in turn. The said reflecting plate 1 includes a plate body and a reflecting layer arranged on the plate body, the reflectivity of the reflecting layer is greater than 98%. Preferably, the said plate body is glass, the reflecting layer is plated on the inner surface of the plate body and is planar. The reflecting plates 1 are connected with each other by mucilage glue, however other connection ways can be used as long as the reflecting plates can be connected securely. Using such structure, the reflecting layer may be formed first, then the reflecting plates may be connected together, this makes the manufacture of the light guide tube easier and low-cost. Furthermore, the reflecting plates formed in such way may have higher uniformity, higher reflectivity, good reflection effect, and higher light utilization efficiency.

Along the exit direction of light, the cylinder includes a light inlet part 11, a light reflecting part 12 and a light outlet part 13 in turn, wherein the light outlet part 13 is larger than the light inlet part 11, so the cylinder is cone shaped, light will be reflected more than twice in the cylinder except the center light. In this implementation, the angle at which light enters into the cylinder is set to a, the angle at which light emits from the cylinder is b, the included angle of the reflecting layer and the center axis 14 of the cylinder is c, the number light being reflected is n, then b=a−2nc. So if the cone shaped cylinder is used, the angle of emitting light may be reduced, the practical requirement may be met more easily.

As shown in FIG. 4, the LED source is arranged at the end of the inlet part. The said LED light source includes white, red, blue and green light chip.

The said lens 112 is arranged in front of the reflective light guide tube.

Because light will be reflected more than twice in the cylinder, once multiple kinds of LED chips of different colors are used, light may be physically mixed during reflection after passed through the cylinder, therefore a uniform virtual point light source or area light source may be formed behind the lens in front of the light guide tube. After the light source passed through the lens, the light color of emitting light will be more uniform with no color difference. Additionally, the lens can carry out a secondary focusing to the light source, in order to meet the requirement for light emitting.

Embodiment 4

Figure 6:
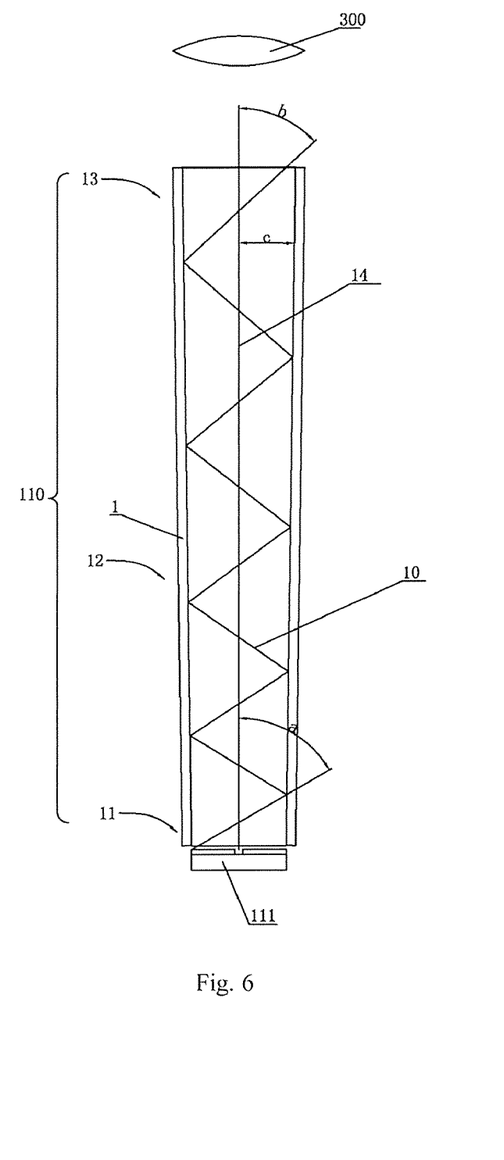
FIG. 6 is a sectional view of a variable focus LED optical system.

As shown in FIG. 6, a variable focus LED optical system includes a reflective light guide tube 110, a LED light source 111 and an optical assembly 300.

As shown in FIG. 1 and FIG. 6, the reflective light guide tube 110 includes a cylinder 100 enclosed by more than three reflecting plates 1 connected with each other in turn. The said reflecting plate 1 includes a plate body and a reflecting layer arranged on the plate body, the reflectivity of the reflecting layer is greater than 98%. Preferably, the said plate body is glass, the reflecting layer is plated on the inner surface of the plate body and is planar. The reflecting plates 1 are connected with each other by mucilage glue, however other connection ways can be used as long as the reflecting plates can be connected securely. Using such structure, the reflecting layer may be formed first, then the reflecting plates may be connected together, this makes the manufacture of the light guide tube easier and low-cost. Furthermore, the reflecting plates formed in such way may have higher uniformity, higher reflectivity, good reflection effect, and higher light utilization efficiency.

Along the exit direction of light, the cylinder includes a light inlet part 11, a light reflecting part 12 and a light outlet part 13 in turn, wherein the light outlet part 13 is larger than the light inlet part 11, so the cylinder is cone shaped, light will be reflected more than twice in the cylinder except the center light. In this implementation, the angle at which light enters into the cylinder is set to a, the angle at which light emits from the cylinder is b, the included angle of the reflecting layer and the center axis 14 of the cylinder is c, the number light being reflected is n, then b=a−2nc. So if the cone shaped cylinder is used, the angle of emitting light may be reduced, the practical requirement may be met more easily.

As shown in FIG. 4, the LED source is arranged at the end of the inlet part. The said LED light source includes white, red, blue and green light chip.

The said optical assembly 300 is arranged in front of the reflective light guide tube. The optical assembly may be composed of a single lens or multiple optical mirrors. The optical assembly may be driven by a driving device, the said driving device includes a base, a screw arranged on the base, a nut fixed in the optical assembly, and a motor. The nut is engaged with the screw, and the motor can drive the screw to rotate, of course, the screw can be rotated manually. When the screw rotates, it will enable the nut to move in a straight line, so the optical assembly will be driven to move, thereby achieving the purpose of adjusting the position of optical assembly. As such, the purpose of adjusting the focus may be achieved easily.

Figure 7:
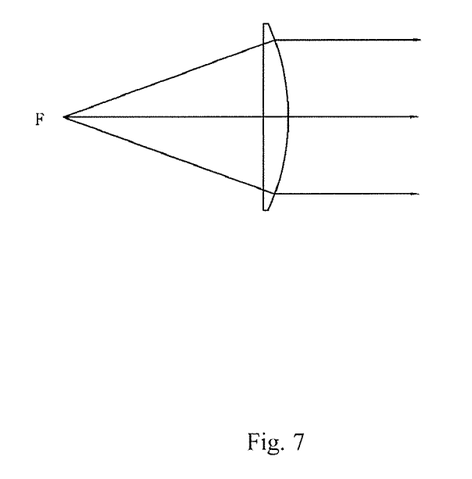
FIG. 7 is a schematic diagram of the divergence angle of light when a point light source is at the focus of an optical assembly.
Figure 8:
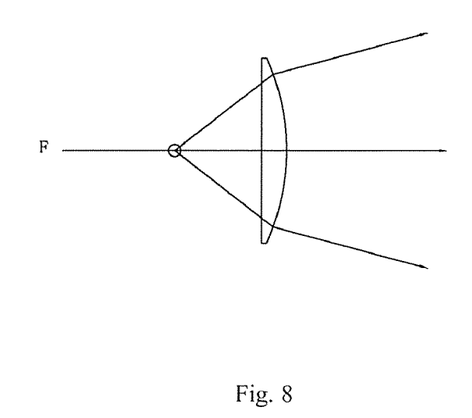
FIG. 8 is a schematic diagram of the divergence angle of light when a point light source is within the focus of an optical assembly.
Figure 9:
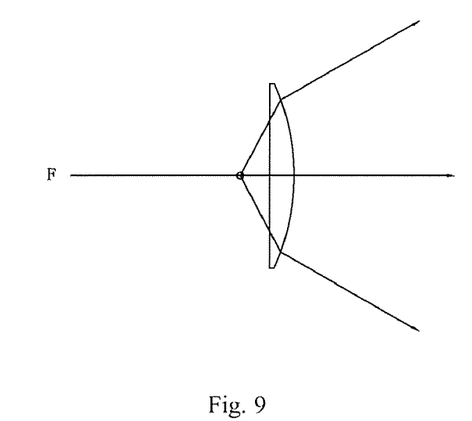
FIG. 9 is a schematic diagram of the divergence angle of light when a point light source is closer to the focus of an optical assembly.

Because light will be reflected more than twice in the cylinder except the center light, once multiple kinds of LED chips of different colors are used, light may be physically mixed during reflection after passed through the cylinder, therefore a uniform virtual point light source or area light source may be formed behind the optical assembly in front of the light guide tube. After the light source further passed through the optical assembly, the light color of emitting light will be more uniform with no color difference. Additionally, as shown in FIG. 7 to FIG. 9, when the light source passes through the optical assembly, if the point light source or area light source is at the focus of the optical assembly, the exit light is parallel light with the smallest angle; if the point light source or area light source is within the focus of the optical assembly, the angle of exit light varies with the distance between the point light source or area light source and the optical assembly, then the effect of adjusting the spot size is realized. The specific principle is: the closer the point light source or area light source to the optical assembly, the larger the divergence angle of light; the farther the point light source or area light source to the optical assembly, the smaller the divergence angle of light, when the point light source or area light source is at the focus, the divergence angle of light is the smallest.

Embodiment 5

Figure 10:
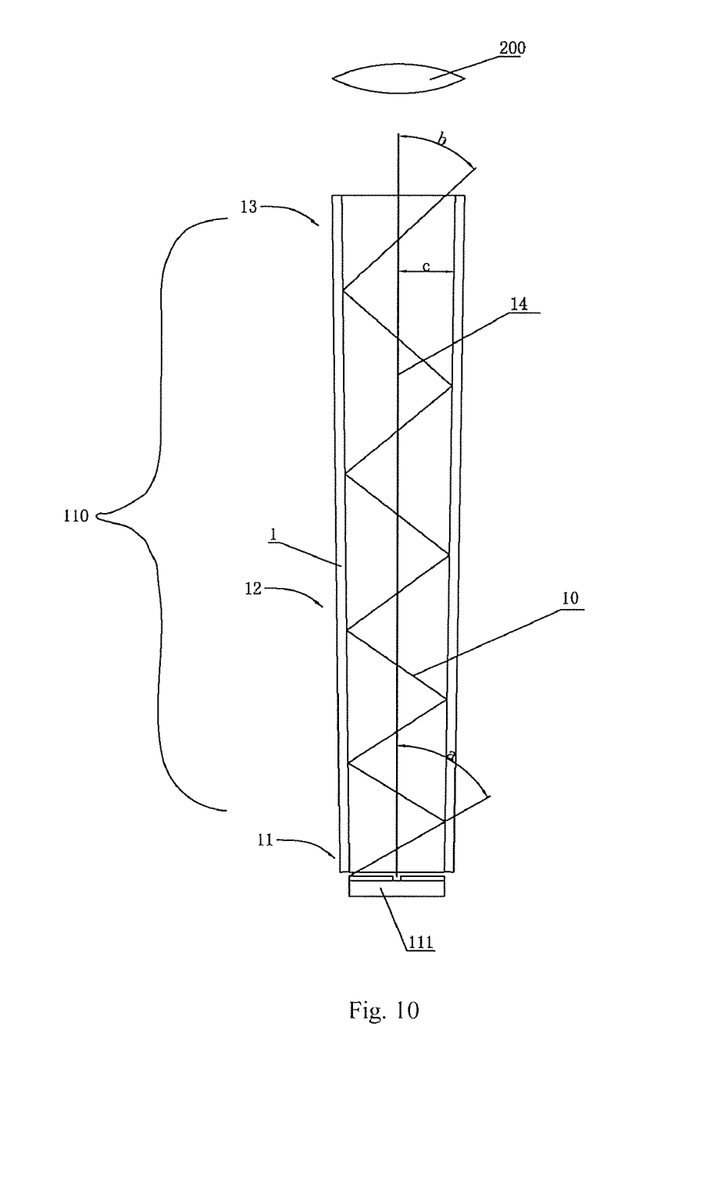
FIG. 10 is a schematic diagram of a stage lamp optical system.

As shown in FIG. 10, a stage lamp optical system includes a reflective light guide tube 110, a LED light source 111 and an optical assembly 200.

As shown in FIG. 1 and FIG. 10, the reflective light guide tube 110 includes a cylinder 100 enclosed by more than three reflecting plates 1 which connected with each other in turn. The said reflecting plate 1 includes a plate body and a reflecting layer arranged on the plate body, the reflectivity of the reflecting layer is greater than 98%. Preferably, the said plate body is glass, the reflecting layer is plated on the inner surface of the plate body and is planar. The reflecting plates 1 are connected with each other by mucilage glue, however other connection ways can be used as long as the reflecting plates can be connected securely. Using such structure, the reflecting layer may be formed first, then the reflecting plates may be connected together, this makes the manufacture of the light guide tube easier and low-cost. Furthermore, the reflecting plates formed in such way may have higher uniformity, higher reflectivity, good reflection effect, and higher light utilization efficiency.

Along the exit direction of light, the cylinder includes a light inlet part 11, a light reflecting part 12 and a light outlet part 13 in turn, wherein the light outlet part 13 is larger than the light inlet part 11, so the cylinder is cone shaped, light will be reflected more than twice in the cylinder except the center light. In this implementation, the angle at which light enters into the cylinder is set to a, the angle at which light emits from the cylinder is b, the included angle of the reflecting layer and the center axis 14 of the cylinder is c, the number the light being reflected is n, then b=a−2nc. So if the cone shaped cylinder is used, the angle of emitting light may be reduced, the practical requirement may be met more easily.

As shown in FIG. 4, FIG. 10 to FIG. 13, the LED source is arranged at the end of the light inlet part. The said LED light source includes white, red, blue and green light chips, the LED light source can be a single chip or multiple chips. When the LED light source is multiple chips, the multiple chips can be of same color or different colors.

Figure 11:
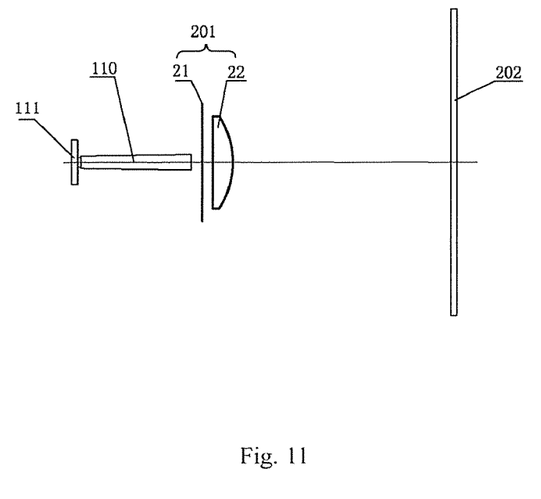
FIG. 11 is a schematic diagram showing a light mixing plate is between a reflective light guide tube and a first condenser.
Figure 12:
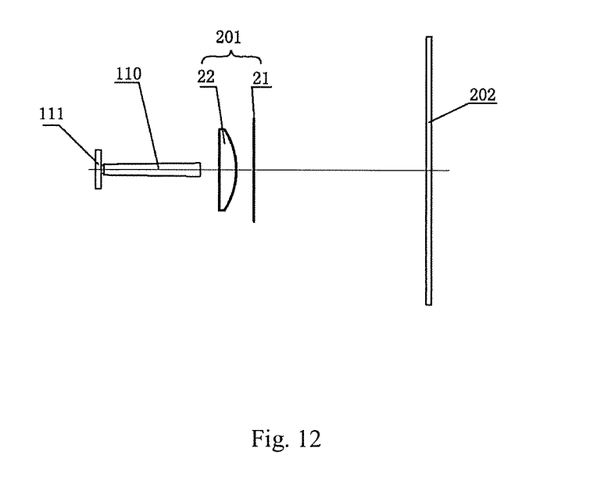
FIG. 12 is a schematic diagram showing a light mixing plate is between a reflective light guide tube and a second condenser.
Figure 13:
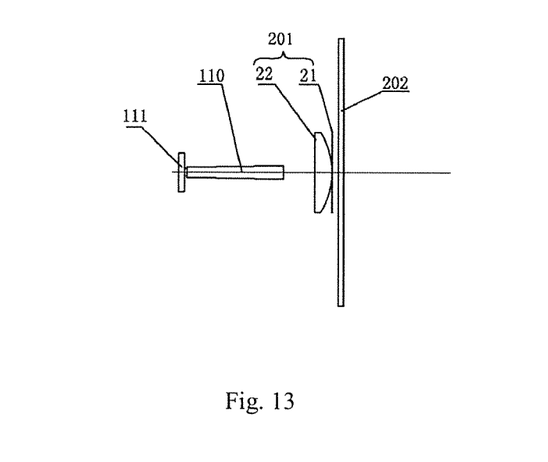
FIG. 13 is a schematic diagram after the adjustment of a second condenser.

The said optical assembly 200 is arranged in front of the reflective light guide tube. As shown in FIG. 11 to FIG. 13, the optical assembly 200 includes light mixing focusing optical assembly 201 and light focusing optical assembly 202. The light mixing focusing optical assembly 201 includes a light mixing plate 21 and more than one first condensers 22. The light mixing plate 21 is a frosted plate or a frosted film or a column distributed micro lenses. In this implementation, the first condenser is single one, and may be a spherical lens, an aspheric lens or a fresnel lens. The light focusing optical assembly 202 is more than one second condensers. In this implementation, the second condenser is single one, and the second condenser is a spherical lens, an aspheric lens or a fresnel lens.

As shown in FIG. 11, along the exit direction of light, the light mixing plate 21, the first condenser 22 and the second condenser may be arranged in order. Of course, as shown in FIG. 5, the light mixing plate 21 may be arranged between the first condenser 22 and the second condenser.

In this embodiment, light will be reflected more than twice in the cylinder 100 except the center light, once multiple kinds of LED chips of different colors are used, light may be physically mixed during reflection after passed through the cylinder 100, therefore a uniform virtual point light source or area light source may be formed at the outlet of the cylinder or behind the optical assembly in front. After the light source further passed through the optical assembly, the light color of emitting light will be more uniform due to the arrangement of the light mixing plate 21, and with no color difference. The said first condenser 22 can focus light for the first time, and the second condenser can carry out a secondary focusing to light.

The first condenser is driven by a driving device, the said driving device includes a base, a screw arranged on the base, a nut fixed in the optical assembly, and a motor. The nut is engaged with the screw, and the motor can drive the screw to rotate, of course, the screw can be rotated manually. When the screw rotates, it will enable the nut to move in a straight line, so the optical assembly will be driven to move, thereby achieving the purpose of adjusting the position of optical assembly. As such, the purpose of adjusting the focus may be achieved easily.

When the light source passes through the second condenser, if the light source through the light mixing focusing optical assembly is at the focus of the second condenser, the exit light is parallel light with the smallest angle; if the light source through the light mixing focusing optical assembly is within the focus of the second condenser, the angle of exit light varies with the distance between the light source through the light mixing focusing optical assembly and second condenser; if the position of the second condenser is changing continuously, change of the size of the light spot emitted may be realized. The specific principle is: the closer the light source through the light mixing focusing optical assembly to the second condenser, the larger the divergence angle of light; the farther the light source through the light mixing focusing optical assembly to the second condenser, the smaller the divergence angle of light, when the light source through the light mixing focusing optical assembly is at the focus, the divergence angle of light is the smallest.

The invention claimed is:

1. A variable focus LED optical system, comprising a reflective light guide tube, a LED light source and an optical assembly, wherein, the reflective light guide tube comprising a tube body enclosed by more than three reflecting plates which connected with each other in turn, the said reflecting plate comprising a plate body and a reflecting layer arranged on the plate body, along the exit direction of light, the tube body comprising a light inlet part, a light reflecting part and a light outlet part in turn, wherein the light outlet part larger than the light inlet part such that the tube body is tapered, the LED light source arranged at the end of the light inlet part, the optical assembly is movably arranged in front of the tube body in the exit direction of light to be movable relative to the reflective light guide tube in the exit direction of light.

2. The variable focus LED optical system as claimed in claim 1, wherein, the LED light source comprises two kinds of LED chips of different colors.

3. The variable focus LED optical system as claimed in claim 1, wherein, the said plate body is a glass plate, the reflecting layer is plated on the inner surface of the glass plate.

4. The variable focus LED optical system as claimed in claim 1, wherein, the reflecting plates are connected with each other by mucilage glue.

5. The variable focus LED optical system as claimed in claim 1, wherein, the said LED light source comprises white, red, blue and green light chips.

6. A stage lamp optical system, comprising a reflective light guide tube, a LED light source and an optical assembly, wherein, the reflective light guide tube comprising a tube body enclosed by more than three reflecting plates which connected with each other in turn, the said reflecting plate comprising a plate body and a reflecting layer arranged on the plate body, along the exit direction of light, the tube body comprising a light inlet part, a light reflecting part and a light outlet part in turn, wherein the light outlet part larger than the light inlet part such that the tube body is tapered, the LED light source arranged at the end of the light inlet part, the optical assembly arranged in front of the tube body in the exit direction of light, comprising a light mixing focusing optical assembly and a light focusing optical assembly sequentially arranged in the direction of the exit direction of light, the light mixing focusing optical assembly comprising a light mixing plate and more than one first condensers, the focusing optical assembly comprising more than one second condensers.

7. The stage lamp optical system as claimed in claim 6, wherein, the LED light source comprises two kinds of LED chips of different colors.

8. The stage lamp optical system as claimed in claim 6, wherein, the said LED light source comprises white, red, blue and green light chips.

9. The stage lamp optical system as claimed in claim 6, wherein, the said plate body is a glass plate, the reflecting layer is plated on the inner surface of the glass plate.

10. The stage lamp optical system as claimed in claim 6, wherein, the reflecting plates are connected with each other by mucilage glue.

11. The stage lamp optical system as claimed in claim 6, wherein, the light mixing plate is arranged between the tube body and the first condenser.

12. The stage lamp optical system as claimed in claim 6, wherein, the light mixing plate is arranged between the first condenser and the second condenser.

13. The stage lamp optical system as claimed in claim 6, wherein, the light mixing plate is a frosted plate or a frosted film or a column distributed micro lenses; the first condenser is a spherical lens, an aspheric lens or a fresnel lens; the second condenser is a spherical lens, an aspheric lens or a fresnel lens.

14. The stage lamp optical system as claimed in claim 6, wherein, the light focusing optical assembly is movable relative to the tube body.

15. The stage lamp optical system as claimed in claim 11, wherein, the light mixing plate is a frosted plate or a frosted film or a column distributed micro lenses; the first condenser is a spherical lens, an aspheric lens or a fresnel lens; the second condenser is a spherical lens, an aspheric lens or a fresnel lens.

16. The stage lamp optical system as claimed in claim 12, wherein, the light mixing plate is a frosted plate or a frosted film or a column distributed micro lenses; the first condenser is a spherical lens, an aspheric lens or a fresnel lens; the second condenser is a spherical lens, an aspheric lens or a fresnel lens.

* * * * *